United States Patent [19]
Masterson et al.

[11] Patent Number: 5,818,613
[45] Date of Patent: Oct. 6, 1998

[54] SYSTEM AND METHOD FOR COLOR SPACE CONVERSION

[75] Inventors: Anthony Masterson, Saratoga; Robert A. Williams, Los Altos; Edward Goldberg, Sunnyvale; Charles Jerian, Menlo Park, all of Calif.

[73] Assignee: Silicon Graphics, Inc., Mountain View, Calif.

[21] Appl. No.: 566,660

[22] Filed: Dec. 4, 1995

[51] Int. Cl.[6] ....................................................... G03F 3/08
[52] U.S. Cl. ........................................... 358/520; 358/518
[58] Field of Search .................................... 358/500, 504, 358/518–523, 539; 348/223, 557, 577, 603; 395/109; 382/166–167

[56] References Cited

U.S. PATENT DOCUMENTS

| | | | |
|---|---|---|---|
| 4,670,780 | 6/1987 | McManus et al. | 358/80 |
| 4,941,038 | 7/1990 | Walowit | 358/80 |
| 5,448,379 | 9/1995 | Ishihara et al. | 358/518 |
| 5,448,380 | 9/1995 | Park | 358/520 |
| 5,483,360 | 1/1996 | Rolleston et al. | 358/518 |

OTHER PUBLICATIONS

Poynton, "Colorspace–faq —FAQ about Colour and Gamma," published on the internet at http://www.inforamp.net/~poynton/Poynton–colour.html, sections G–0 –G–19 and C–1 —C–47, May 28, 1995.

Poynton, "Poynton's Colour FAQ," sections 0 –47, May 27, 1995.

*Primary Examiner*—David K. Moore
*Assistant Examiner*—Stephen Brinich
*Attorney, Agent, or Firm*—Sterne, Kessler, Goldstein & Fox P.L.L.C.

[57] ABSTRACT

A system and method for converting a color represented in a first color space to the color represented in a second color space uses a constant hue algorithm. The constant hue algorithm is used to compensate invalid colors in the second color space obtained as a result of the conversion. The constant hue algorithm determines a compensation factor that, in effect, blends the invalid color with pure grey until the invalid color becomes a valid color in the second color space. The compensation factor is optionally stored with the valid color in the second color space so that the original color in the first color space can be subsequently recovered.

20 Claims, 8 Drawing Sheets

SYSTEM AND METHOD FOR COLOR SPACE CONVERSION

BACKGROUND OF THE INVENTION

1. Field of the Invention

The present invention relates generally to displaying video and computer images, and more specifically, to converting colors of pixels in the images from one color space to an another color space.

2. Related Art

An image to be displayed on a monitor or television screen is represented by a matrix of points referred to as pixels. The pixels are scanned across the monitor or screen both horizontally and vertically. Each pixel has an associated color that is typically represented by a particular set of values of three different components. The three different components used to represent the color define a color space.

The color space is a mathematical representation of a set of colors. Several color spaces are presently used in various different applications. An RGB color space represents color as levels of red (R), green (G), and blue (B). The RGB color space is used in color computer graphics. A YUV color space represents color as intensity (Y) and two color difference components (U, V). The YUV color space is used in television equipment and was developed to accommodate both black-and-white and color televisions. Other color spaces include CMYK, HSI, and HSV.

Each color space has been developed according to various industry standards. These standards define a valid range of values for each of the respective components referred to as a valid component range. These standards also define equations and coefficients to be used to convert the color of a pixel from one color space to another color space. For example, conversion between the RGB color space and the YUV color space is accomplished with a well established set of equations.

Conversion of the color between various color spaces is necessary as the lines between computer equipment and television equipment becomes blurred. For example, multimedia systems employing a computer system to display television images must convert the television image into an image displayable on the computer. The multimedia system must convert the television image from the YUV color space to a computer image in the RGB color space.

One problem associated with this conversion is due to the valid component ranges of the components in the respective color spaces. The valid component ranges in a particular color space can be represented as a rectangular cube in three dimensional space. Each color in the particular color space is defined by a set of three points referred to as a triplet, within the rectangular cube. A triplet having each of its components with the valid component range of the color space, and hence, within the cube of the color space, is referred to as a valid triplet. A triplet having one or more components outside the valid component range of the color space, or outside the cube of the color space, is referred to as an invalid triplet.

A cube representing the RGB color space (RGB cube) lies entirely within a cube representing the YUV color space (YUV cube). Thus, every valid RGB triplet corresponds to a valid YUV triplet, but not every valid YUV triplet corresponds to a valid RGB triplet because some valid YUV triplets lie outside the RGB cube.

One method conventional systems have used to address invalid RGB triplets is to clip each component to its maximum (or minimum) value. This method produces an undesirable color shift that, in many cases, is readily apparent to the viewer.

Another method conventional systems have used to address invalid RGB triplets is to choose RGB values that hold luminance and hue constant and reduce saturation until the invalid RGB triplet becomes valid. This method shifts bright colors to white and dark colors to black. As a result, the overall displayed image becomes more black and white. This effect is also readily apparent to the viewer.

A second problem associated with the conversion of a color between color spaces is due to conventional systems attempting to solve the first problem. Once a conventional system has adjusted, or compensated, the invalid RGB triplet to be within the valid RGB component range, the original YUV triplet can not be subsequently recovered from the adjusted, or compensated, RGB triplet. Thus, in conventional systems, not only is some color information lost during the conversion, but conventional systems do not provide any means for storing or recovering the lost color information.

What is needed is a system and method for color space conversion that preserves the quality of the original image with respect to the viewer without the undesirable effects introduced by conventional systems and that allows the original image to be subsequently recovered without loss of information.

SUMMARY OF THE INVENTION

The present invention is directed to a system and method for converting a color represented in a first color space into the color represented in the second color space. The present invention compensates for valid colors in the first color space that result in subsequent invalid colors in the second space as a result of the conversion by implementing a constant hue algorithm. The constant hue algorithm blends the invalid color in the second color space with a pure grey color resulting in a valid color in the second color space. The blending adjusts to the color's saturation and luminance without affecting the color's hue.

One of the features of the present invention is that a system user realizes a change in the color's intensity which is preferred over realizing a change in the color's hue.

Another feature of the present invention is that a compensation factor is optionally stored with the valid color in the second color space so that the original color in the first color space can be subsequently recovered.

Still another feature of the present invention is that the compensation factor is stored, utilizing the alpha channel implemented in various computer equipment, by substituting the alpha value (i.e., opacity) with the compensation factor.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Overview

The present invention is directed to a system and method for converting a color represented in a first color space into a corresponding color represented in the second color space. The present invention uses a constant hue algorithm to compensate for valid colors in the first color space that result in subsequent invalid colors in the second space. The constant hue algorithm blends the invalid color in the second color space with a pure grey color resulting in a valid color in the second color space. The blending adjusts to the color's saturation and luminance without affecting the color's hue. The present invention also determines a compensation factor based on the amount of blending performed by the constant hue algorithm so that the original color in the first color space can be subsequently recovered.

Example Environment

The present invention is now described in terms of an example environment. Specifically, the present invention is described in terms of converting a color in a YUV color space to a corresponding color in an RGB color space. This conversion is useful for converting images between video equipment and computer equipment. Description in these terms is provided for convenience only. It is not intended that the invention be limited to application in this example environment. In fact, after reading the following description, it will become apparent to a person skilled in the relevant art how to implement the invention in alternative environments.

Figure 1:
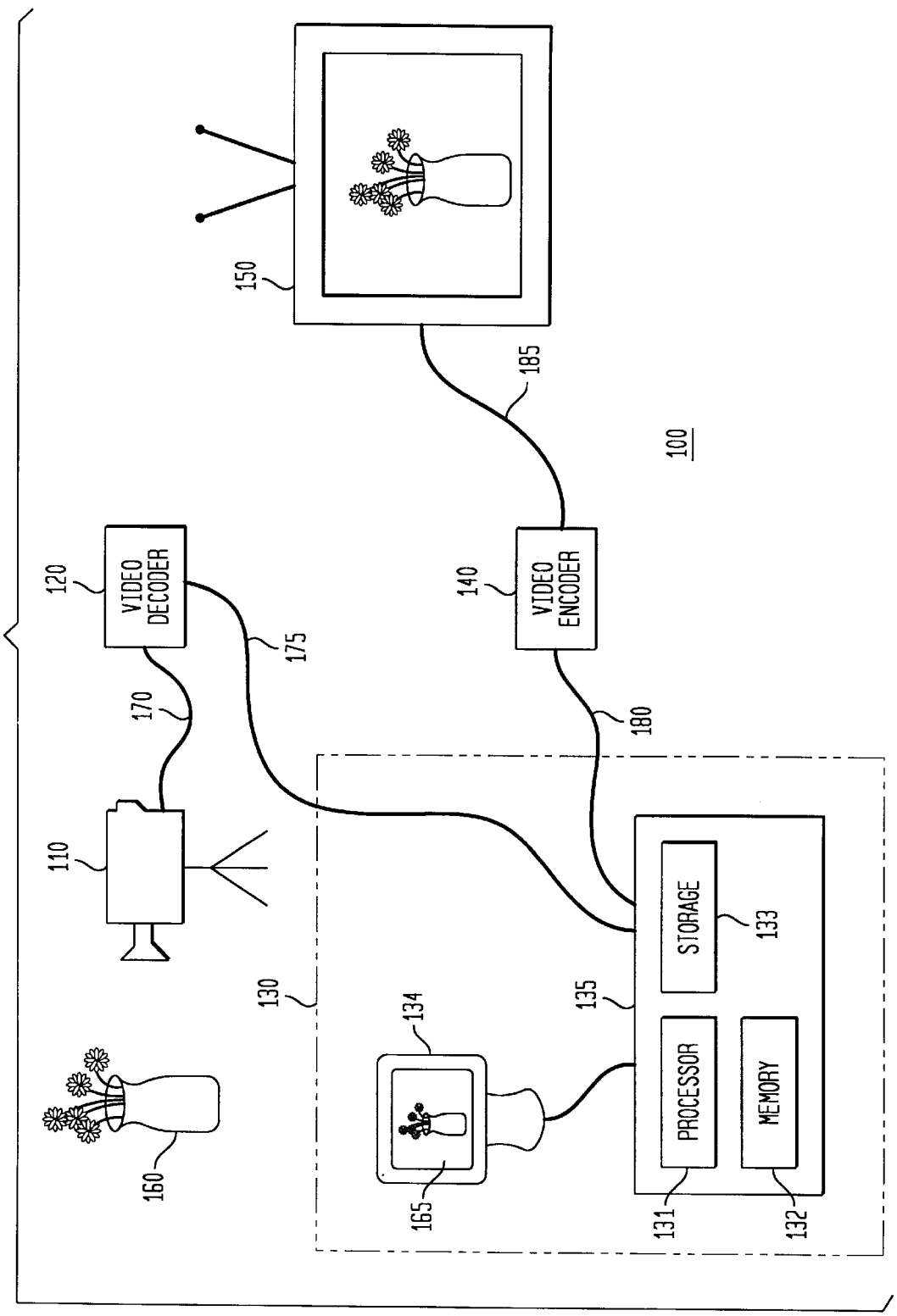
FIG. 1 illustrates a video imaging system that utilizes the present invention.

FIG. 1 illustrates a video imaging system 100 that serves as an example environment for the present invention. Video imaging system 100 includes a video camera 110, a video decoder 120, a computer system 130, a video encoder 140, and a television 150. Computer system 130 includes a general purpose computer 135 including processor 131, a memory 132, and a storage device 133. Computer system 130 also includes a monitor 134.

Video camera 110 creates an optical image of an object 160. Video camera 110 transforms the optical image of object 160 into a video signal 170 representing the optical image. Video decoder 120 receives video signal 170 from video camera 110 and transforms video signal 170 into a computer graphics signal 175 so that computer system 130 can operate upon and display a computer image 165 of object 160 on monitor 134.

Various computer software applications are available that allow a user, operating on computer system 130, to modify and/or alter computer image 165. Such applications allow a user to modify and/or alter computer image 165 in a variety of ways including enhancement, sharpening, blurring, scaling, color correction, painting, and rotoscoping. Once the user has modified computer image 165, the user typically would like to output modified computer image 165 to other video equipment such as television 150. Computer system 130 outputs a computer graphics signal 180 representative of modified computer image 165. However, before television 150 can display modified computer image 165, computer graphics signal 180 must be transformed back into a video signal 185. This is accomplished via video encoder 140. Video encoder 140 receives computer graphics signal 180 from computer system 130 and transforms computer graphics signal 180 into video signal 185.

Color Space Conversions

One aspect of the transformations performed by video decoder 120 and video encoder 140 is to convert colors back and forth between a color representation, i.e., color space, used by video equipment and a color space used by computer equipment. Both types of equipment represent a discrete point in an image as a pixel. One characteristic of the pixel is the pixel's color. Video equipment typically represents color in a YUV color space, while computer equipment typically represents color in a RGB color space. Thus, video decoder 120 must convert a color of pixel represented in the YUV color space into the corresponding color represented in the RGB color space.

Figure 2:
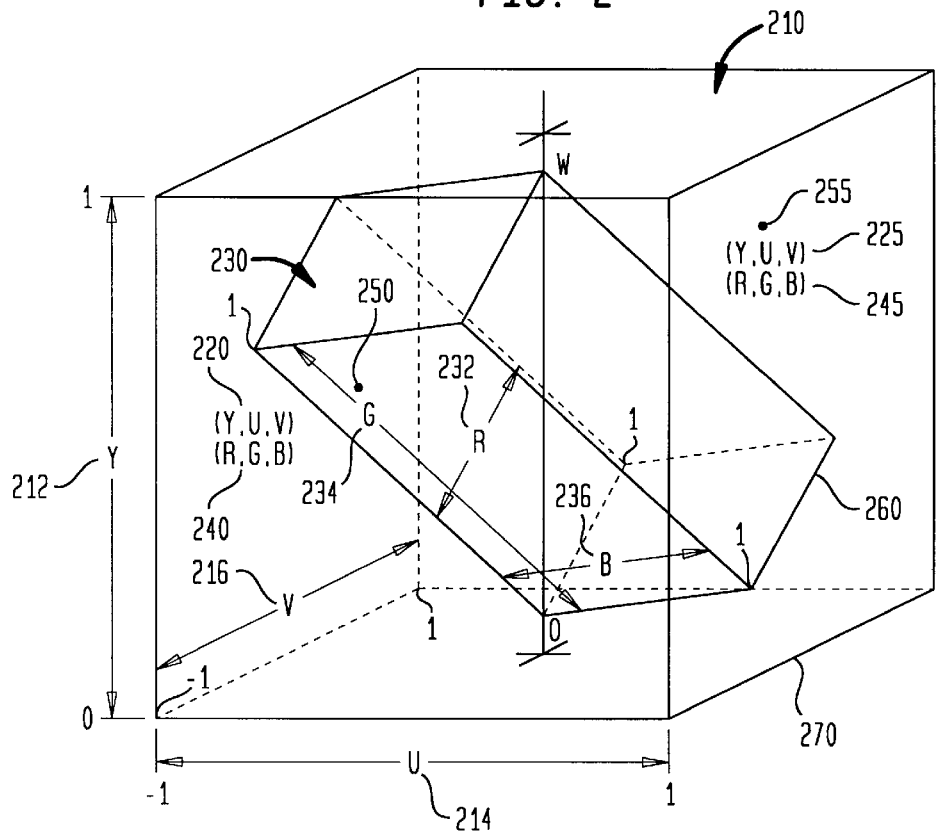
FIG. 2 illustrates typical color spaces used by television equipment and computer equipment.

FIG. 2 illustrates the relationship between a YUV color space 210 and an RGB color space 220. YUV color space 210 is comprised of a luminance component 212 (Y component 212) and two color difference signal components: a first color difference component 214 (U component 214) and a second color difference component 216 (V component 216). The three components, i.e., Y component 212, U component 214, and V component 216, form a YUV triplet 220. YUV triplet 220 represents color 250 in YUV color space 210.

In contrast, computer equipment typically uses a RGB color space 230. RGB color space 230 is comprised of a red component 232 (R component 232), a green component 234 (G component 234), and a blue component 236 (B component 236). The three components, i.e., R component 232, G component 234, and B component 236, form a RGB triplet 240. RGB triplet 240 represents color 250 in RGB color space 230.

As shown in FIG. 2, RGB color space 230 is represented by an RGB cube 260. RGB cube 260 defines RGB color space 230 in terms of a fixed range of values for each component. This fixed range of values for each component is referred to as a valid component range. Only colors 250 within RGB cube 260 can be validly represented in RGB color space 230. A color outside RGB cube 260, such as color 255, has one or more components outside the valid component range for RGB color space 230. For purposes of this discussion, the valid component range for RGB color space 230 varies between 0 (no amount of the component) and 1 (a maximum amount of the component) for each of R component 232, G component 234, and B component 236. As will be apparent to those skilled in the art, the ranges can be scaled accordingly. Typical systems employing RGB color space 230 represent each value in this range with eight or more bits. A preferred embodiment of the present invention uses ten bits to represent each component in RGB color space 230. Thus, the valid component range for each component in a preferred embodiment is 0 to 1023.

YUV color space 210 is represented by YUV cube 270. Each component in YUV color space 210 also has a valid component range. For purposes of this disclosure, Y component 212 in YUV color space 210 will be described as having a valid component range of 0 to 1, while U component 214 and V component 216 will be described as having a valid component range of −1 to 1. The ranges between RGB color space 230 and YUV color space 210 are not equivalent as a result of the components used in the two color spaces.

FIG. 2 shows that YUV cube 270 is larger that RGB cube 260. In fact, RGB cube 260 is entirely within YUV cube 270. This is due to the choice of multiplication coefficients in the conversion equations. FIG. 2 shows that every RGB triplet 250 having components within the valid component range of RGB color space 230 corresponds to a valid YUV triplet 220 having components within the valid component range of YUV color space 210. In other words, every valid color in RGB color space 230 corresponds to a valid color in YUV color space 210. However, the reverse is not true. Every valid color in YUV color space 210 does not necessarily correspond to a valid color in RGB color space 230. This is best illustrated by the following example. Color 250 can be equivalently represented by either YUV triplet 220 or RGB triplet 240. Color 255 can only be exactly represented by YUV triplet 280. Some adjustment must be made to color 255 in order to approximate color 255 as a valid color in RGB cube 260.

Conversion from YUV Color Space to RGB Color Space

Figure 3:
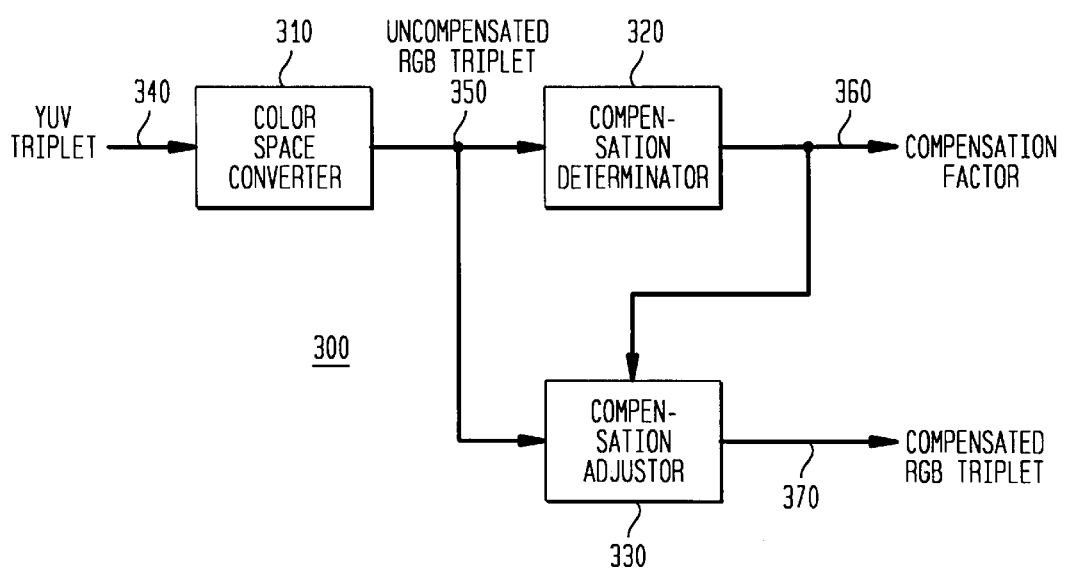
FIG. 3 is a block diagram illustrating a translator useful for performing a conversion from a YUV color space to an RGB color space according to the present invention.
Figure 4:
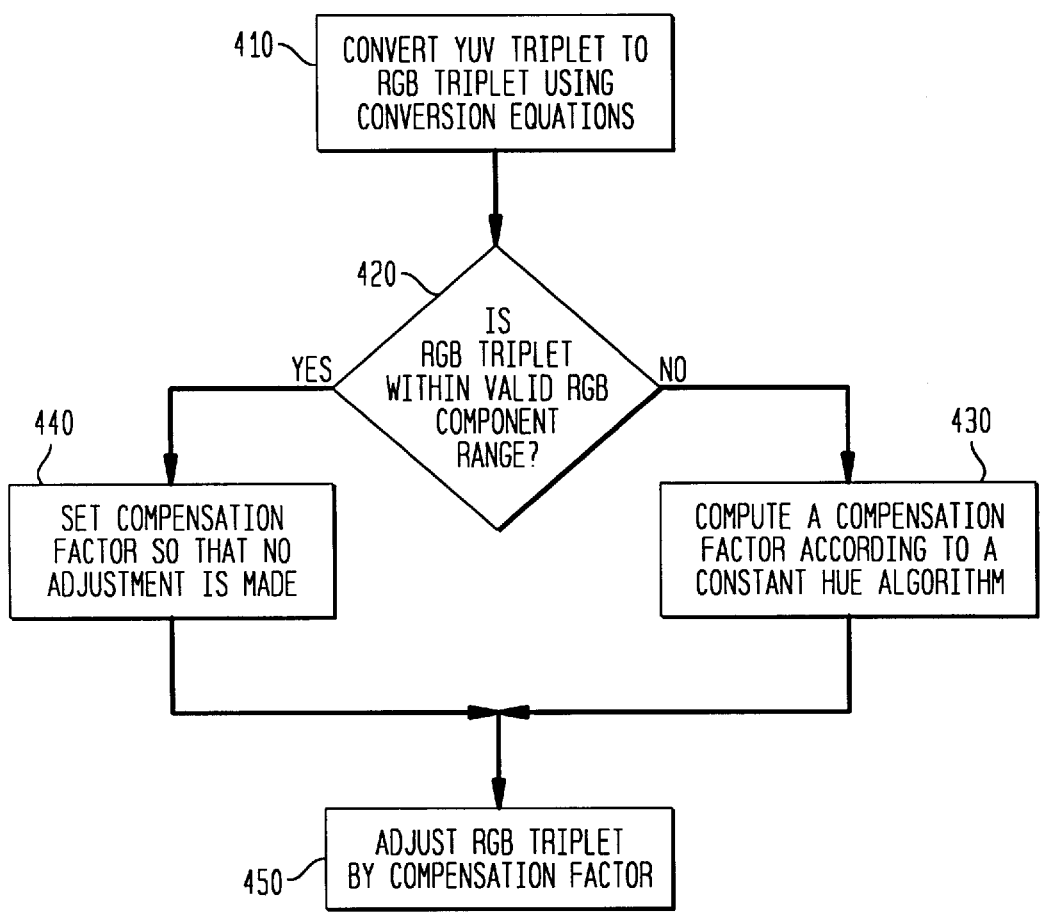
FIG. 4 illustrates the method steps performed while converting a color from a YUV color space to an RGB color space.

FIG. 3 is a block diagram of a translator 300, according to the present invention, useful for performing the conversion of a color from YUV color space 210 to RGB color space 230. Translator 300 includes a color space converter 310, a compensation determinator 320, and a compensation adjustor 330. Translator 300 receives as input a YUV triplet 340. Translator 300 outputs an RGB triplet 370 and a compensation factor 360. FIG. 4 illustrates the method steps performed while converting a color from YUV color space 210 to RGB color space 230. The operation of translator 300 is now described with reference to FIG. 3 and FIG. 4.

In a step 410, color space converter 310 converts YUV triplet 340 into an RGB triplet 350 using conversion equations for converting YUV color space 210 to RGB color space 230. One set of conversion equations are provided below for convenience.

$$R = (2 * (1 - Cr) * V + Y)), \quad \text{(Eq. 1A)}$$
$$G = Y - (2 * Cb * (1 - Cb)/Cg) * U$$
$$- (2 * Cr * (1 - Cr)/Cg) * V, \quad \text{(Eq. 1B)}$$
and
$$B = (2 * (1 - Cb) * U + Y)), \quad \text{(Eq. 1C)}$$
where $$Cr = 0.299,$$
$$Cb = 0.114,$$
and
$$Cg = 0.587.$$

The result of applying the conversion equations to YUV triplet 340 results in an uncompensated RGB triplet 350.

In a decision step 420, compensation determinator 320 determines whether uncompensated RGB triplet 350 is within RGB cube 260. Compensation determinator 320 accomplishes this by determining whether each component of uncompensated RGB triplet 350 is within the valid component range of RGB color space 210. If each component of uncompensated RGB triplet 350 is within the valid component range of RGB color space 210, uncompensated RGB triplet 350 is a valid RGB triplet within RGB cube 260 and processing continues at a step 440. Otherwise, uncompensated RGB triplet 350 is an invalid RGB triplet outside of RGB cube 260 and processing continues at a step 430.

In step 440, compensation determinator 320 determines compensation factor 360 so that effectively no adjustment will be made to uncompensated RGB triplet 350 because uncompensated RGB triplet 350 is already a valid RGB triplet. Thus, the present invention only adjusts invalid RGB triplets but determines compensation factor 360 for both valid and invalid RGB triplets. In the preferred embodiment, compensation factor 360 has a range of values between 0 and 1, where compensation factor 360 is set to 1 for uncompensated RGB triplets that are valid RGB triplets.

In step 430, compensation determinator 320 determines a compensation factor 360 according to a constant hue algorithm. A constant hue algorithm adjusts both saturation and luminance while holding hue constant. In effect, the image is blended with a flat grey color to the point where an invalid RGB triplet becomes a valid RGB triplet. The amount of blending required is determined as compensation factor 360. In a preferred embodiment, compensation factor 360 is determined so as to minimize the amount of blending required. The determination of compensation factor 360 is discussed in further detail below. After compensation factor 360 is determined, processing continues at a step 450.

In step 450, compensation adjustor 330 adjusts uncompensated RGB triplet 350 using compensator factor 360. In one embodiment of the present invention, compensation adjustor 330 adjusts uncompensated RGB triplet 350 by multiplying it by compensation factor 360. The result of the multiplication is compensated RGB triplet 370.

In a preferred embodiment of the present invention, the constant hue algorithm is modified to adjust uncompensated RGB triplet 350 so that a pure grey color remains a pure grey color irrespective of the adjustment. A pure grey color is defined by the triplet having components in RGB color space 230 as (R,G,B)=(0.5,0.5,0.5). The modification involves shifting the valid component range of RGB space 230 from the range 0 to 1 to a valid component range of −0.5 to 0.5 prior to adjusting uncompensated RGB triplet 350. This shift effectively ensures that a pure grey color, which is represented as the triplet (0,0,0) after the shift, remains a pure grey color. After compensating uncompensated RGB triplet 350 by compensation factor 360, the valid component range of RGB color space 230 is shifted back to the range 0 to 1.

Figure 5:
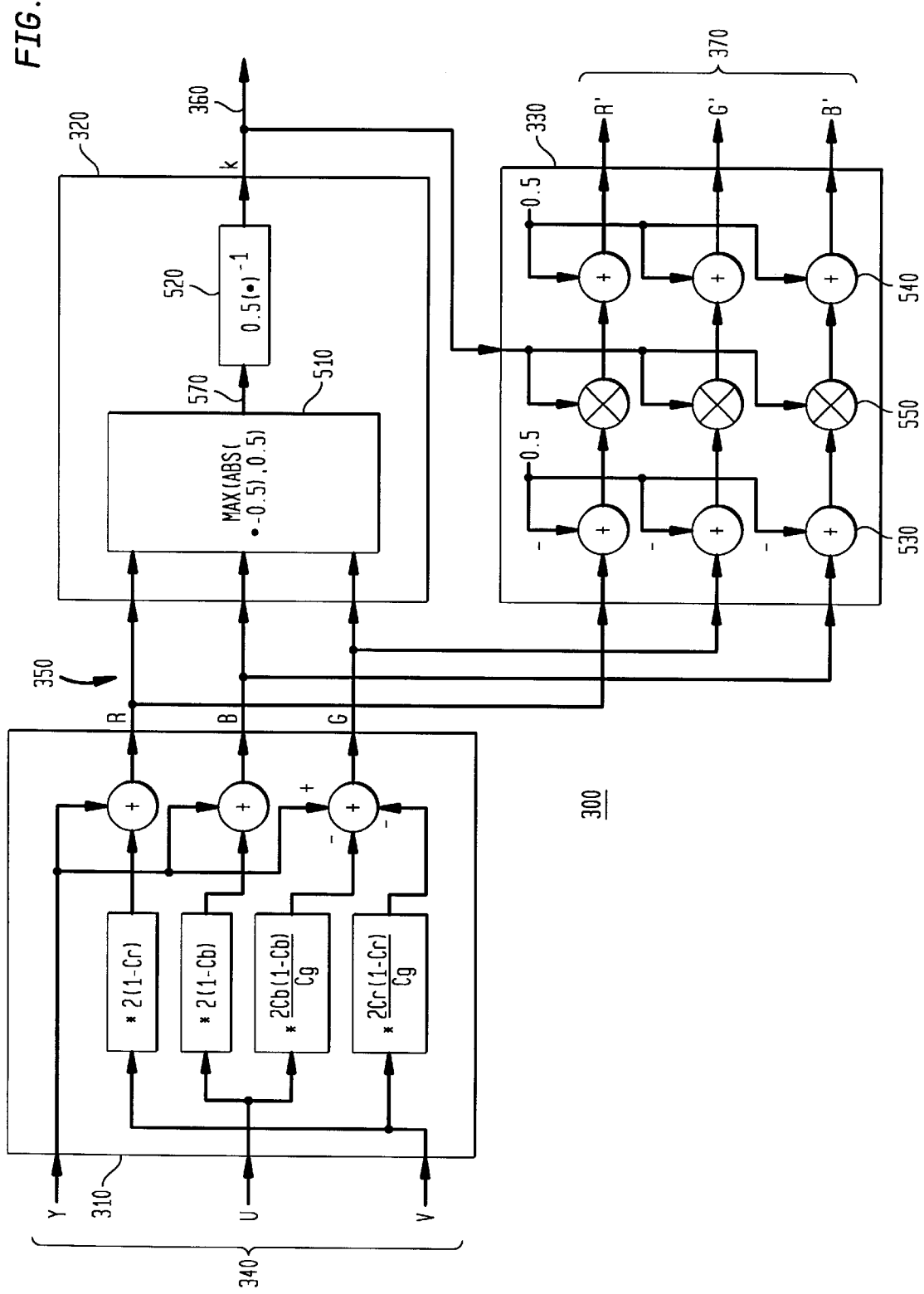
FIG. 5 is a block diagram illustrating one embodiment of a translator for performing the conversion from a YUV color space to an RGB color space according to the present invention.

FIG. 5 is a block diagram illustrating one embodiment of translator 300 according to the present invention in greater detail. Specifically, FIG. 5 illustrates the operations performed by translator 300. These operations can be implemented in a variety of ways. As will be apparent to one skilled in the art, these operations may be implemented in hardware, such as with adders and multipliers, etc., or in hardware lookup tables (LUT). Alternatively, these operations may be implemented in software, firmware, microcode, etc., running on a computer. The present invention applies equally well to both implementations as well as hybrid implementations using both hardware and software.

Color space converter 310, compensation determinator 320, and compensation adjustor 330 are illustrated in FIG. 5 as implementing a specific embodiment of the present invention for converting YUV color space 210 to RGB color space 230. After reading this discussion, other implementations will be readily apparent.

Color space converter 310 includes the operations required to implement Eq. 1 in order to determine uncompensated RGB triplet 350 from YUV triplet 340. Compensation determinator 320 includes a function block 510. In one embodiment of the present invention, function block 510 receives uncompensated RGB triplet 350 and outputs a result according to the following function:

$$f_{510}(R,G,B)=\max(|R-0.5|,|G-0.5|,|B-0.5|,0.5). \quad \text{(Eq. 2)}$$

According to Eq. 2, function block 510 shifts each uncompensated component of RGB triplet 350 by −0.5, determines an absolute value for each shifted component, and returns, as a result 570, the maximum from among these absolutes values and the value 0.5. The value 0.5 exists in function block 510 to accommodate uncompensated RGB triplets 350 that are valid RGB triplets (i.e., when function block 510 returns 0.5, compensation factor 360 will subsequently attain a value of 1.)

Compensation determinator 320 also includes function block 520. In one embodiment of the present invention function block 520 receives result 570 and outputs a result according to the following function:

$$f_{520}(x)=0.5 * x^{-1}, \quad \text{(Eq. 3)}$$

where x is result 570.

According to Eq. 3, function block 520 takes the inverse of result 570 and multiplies the inverse by 0.5. The result of function block 520 is compensation factor 360.

Compensation adjustor 330 includes a first summer bank 530, a multiplier bank 550, and a second summer bank 540. First summer bank 530 performs a shift of each component of uncompensated RGB triplet 350 by −0.5 according to a preferred embodiment of the constant hue algorithm as discussed above. Multiplier bank 550 multiplies the shifted uncompensated RGB triplet by compensation factor 360. Second summer bank 540 performs the shift of shifted compensated RGB triplet by 0.5 to result in compensated RGB triplet 370. The net effect of compensation adjustor 330 is to implement the blending, based on compensation factor 360, of uncompensated RGB triplet 350 with pure grey to result in compensated RGB triplet 370. This effect is represented with the following equation:

$$(R', G', B') = (1 - k) * (0.5, 0.5, 0.5) + k * (R, G, B) \quad \text{(Eq. 4)}$$

where (R', G', B') is compensated RGB triplet 370,
(R, G, B) is uncompensated RGB triplet 350,
(0.5, 0.5, 0.5) represents pure grey in RGB color space 230, and k is compensated factor 360.

Figure 6:
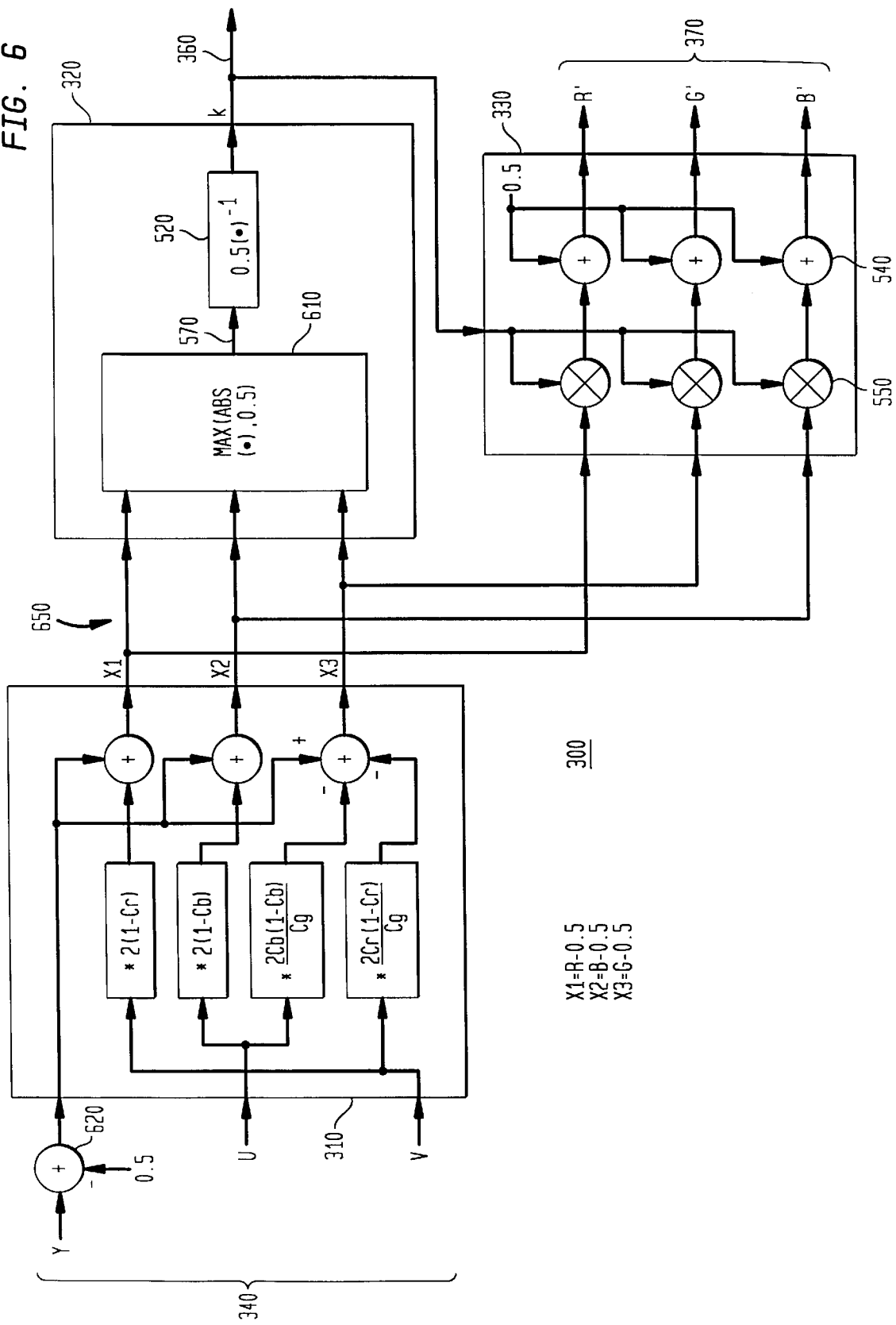
FIG. 6 is a block diagram illustrating a preferred embodiment of a translator for performing the conversion from a YUV color space to an RGB color space according to the present invention.

FIG. 6 is a block diagram illustrating a preferred embodiment of translator 300 according to the present invention greater detail. Specifically, FIG. 6 illustrates some efficiencies obtained in the operations performed by translator 300. A summer 620 is included in the preferred embodiment of translator 300. Summer 620 serves to shift the Y component of YUV triplet 340 by −0.5. The shifted Y component is input to color space converter 310. The output of color space converter 310 is an uncompensated shifted RGB triplet 650 denoted by triplet (X1,X2,X3) where

| | |
|---|---|
| X1 = R − 0.5 | (Eq. 5A) |
| X2 = B − 0.5 | (Eq. 5B) |
| X3 = G − 0.5. | (Eq. 5C) |

In effect, the presence of summer 620 simplifies two things. First, function block 510 in compensation determinator 320 becomes function block 610. Second, first summer bank 530 in compensation adjustor 330 is eliminated. Each of these simplifications is discussed in further detail below.

Function block 610 receives uncompensated shifted RGB triplet 650 and outputs a result according to the following function:

$$f_{610}(X1,X2,X3)=\max(|X1|,|X2|,|X3|,0.5). \quad \text{(Eq. 6)}$$

According to Eq. 6, function block 610 determines an absolute value for each component of uncompensated shifted RGB triplet 650 and returns, as result 570, the maximum from among these absolutes values and the value 0.5. The rest of compensation determinator 320 remains the same as the embodiment illustrated in FIG. 5.

First summer bank 330 serves to shift uncompensated RGB triplet 350. This is no longer required because summer 620 effectively performs this shift. Thus, first summer bank 330 can be eliminated from compensation adjustor 330. The rest of compensation adjustor 330 remains the same an in the embodiment described with respect to FIG. 5.

Conversion from RGB Color Space back to YUV Color Space

Figure 7:
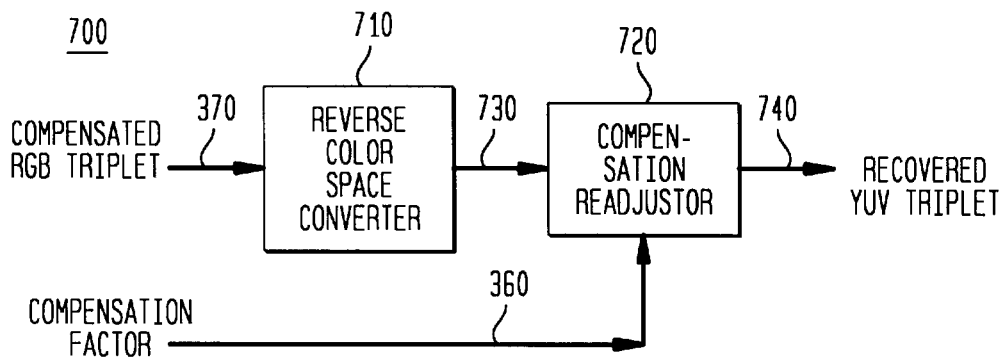
FIG. 7 is a block diagram illustrating a translator useful for performing the conversion from an RGB color space back to YUV color space according to the present invention.
Figure 9:
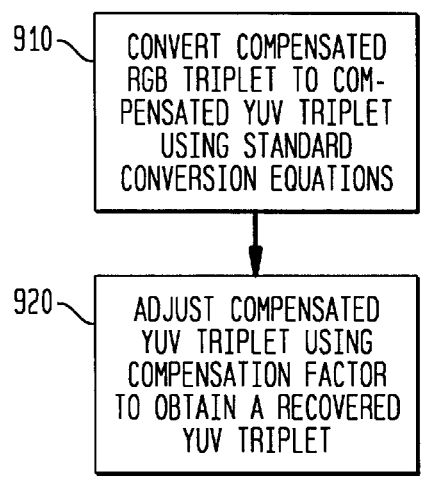
FIG. 9 illustrates the method steps, according to the present invention, performed while converting a color from an RGB color space back to YUV color space.

FIG. 7 is a block diagram of a translator 700, according to the present invention, useful for performing the conversion of a color from RGB color space 230 back to YUV color space 210. For, the case where the color from RGB color space 230 is a result of a conversion as described above, translator 700 includes an reverse color space converter 710 and a compensation readjustor 720. Translator 700 receives as input compensated RGB triplet 370 and compensation factor 360. Translator 700 outputs a recovered YUV triplet 740. FIG. 9. illustrates the method steps performed while converting a color from RGB color space 230 to YUV color space 210. The operation of translator 700 is now described with reference to FIG. 7 and FIG. 9.

In a step 910, reverse color space converter 710 determines a compensated YUV triplet 730 from compensated RGB triplet 370 using conversion equations for converting RGB color space 230 to YUV color space 210. These conversion equations can be obtained from Eq. 1 and are provided below.

$$Y' = Cr * R' + Cg * G' + Cb * B', \quad \text{(Eq. 7A)}$$
$$U' = B'/2 - R' * (Cr/(2 * (Cr + Cg)))$$
$$\quad - G' * (Cg/(2 * (Cr + Cg))), \quad \text{(Eq. 7B)}$$
and
$$V' = R'/2 - B' * (Cb/(2 * (Cb + Cg)))$$
$$\quad - G' * (Cg/(2 * (Cb + Cg))), \quad \text{(Eq. 7C)}$$
where (Y', U', V') is compensated YUV triplet 730, and (R', G', B') is compensated RGB triplet 370.

In a step 920, compensation readjustor 720 uses compensation factor 360 and compensated YUV triplet 730 to determine a recovered YUV triplet 740. Compensation readjustor 720 determines recovered YUV triplet according to the following equations:

$$Y = 1/k * (Y' - 0.5), \quad \text{(Eq. 8A)}$$
$$U = 1/k * U', \quad \text{(Eq. 8B)}$$
and
$$V = 1/k * V'. \quad \text{(Eq. 8C)}$$

Figure 8:
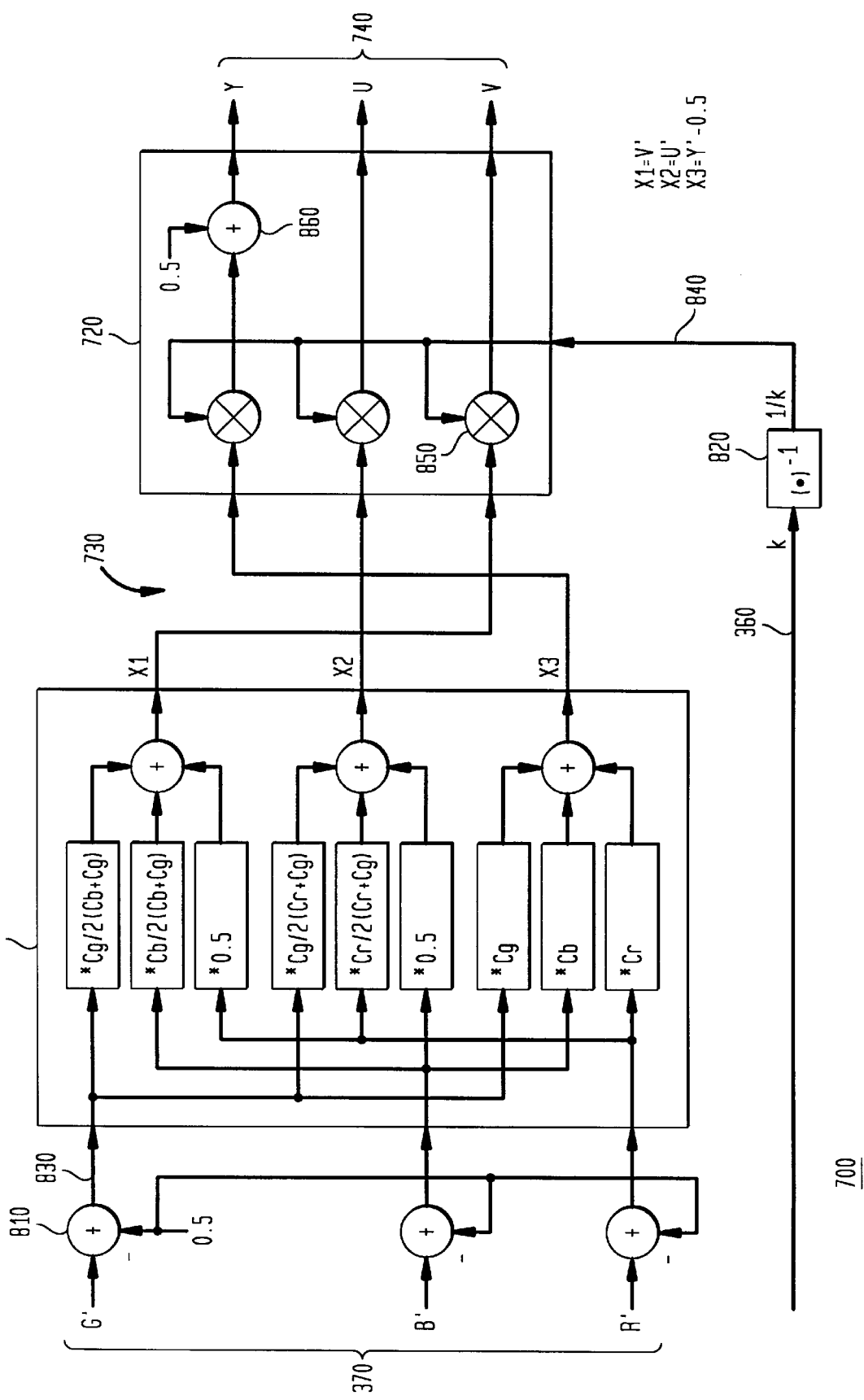
FIG. 8 is a block diagram illustrating a preferred embodiment of a translator useful for performing the conversion from an RGB color space back to YUV color space according to the present invention.

FIG. 8 is a block diagram illustrating a preferred embodiment of translator 700 according to the present invention. Specifically, FIG. 8 illustrates the operations performed by translator 700 in greater detail. These operations can be implemented in a variety of ways. As will be apparent to one skilled in the art, these operations may be implemented in hardware, such as with adders and multipliers, etc., or in hardware lookup tables (LUT). Alternatively, these operations may be performed in software, firmware, microcode, etc., running on a computer. The present invention applies equally well to both implementations as well as various hybrid implementations using both hardware and software.

A preferred embodiment of translator 700 includes a summer bank 810 and an inverting block 820 in addition to reverse color space converter 710 and compensation readjustor 720. Summer bank 810 shifts compensated RGB triplet 370 by −0.5 to shift the valid component range from the range 0 to 1 to the range −0.5 to 0.5 as discussed above. Summer bank 810 outputs a shifted compensated RGB triplet 830.

Reverse color space converter 710 includes the operations required to implement Eq. 7 to thereby determine compensated YUV triplet 730 from compensated RGB triplet 370. Reverse color space converter receives shifted compensated RGB triplet 830 and outputs compensated YUV triplet.

Inverting block 820 receives compensation factor 360 and outputs an inverse compensation factor 840. Inverting block 820 implements an inverse operator as shown. Compensation readjustor 720 receives compensated YUV triplet 730 and inverse compensation factor 840 and outputs recovered YUV triplet 740. Compensation readjustor 720 includes a multiplier bank 850 and a summer 860.

Multiplier bank 850 multiplies each component of compensated YUV triplet 730 by inverse compensation factor 840. Summer 860 shifts the Y component of this result by 0.5 to obtain recovered YUV triplet 740. Compensation readjustor 720 recovers the original YUV triplet 340 as recovered YUV triplet 740. For all practical purposes, YUV triplet 740 is equivalent to YUV triplet 340 and will differ only slightly due to errors, such as rounding, in arithmetic operations performed. This difference will obviously depend on implementation, i.e., number of bits used, fixed point versus floating point operations, etc.

The net effect of translator 700 is to remove the blending with pure grey performed during the conversion from YUV color space 210 to RGB color space 230. This is only accomplished by the preservation of compensation factor 360. Various methods of preserving compensation factor 360 could be implemented including storing color triplets as color quadruplets. A preferred method that uses existing resources in computer equipment optionally preserves compensation factor 360 on an unused alpha channel found in conventional computer equipment. This is described in the following section.

Using Alpha Channel for Storing Compensation Factor

In the present invention, compensation factor 360 is stored with compensated RGB triplet 370 to represent the color of the pixel being converted from YUV color space 210 to RGB color space 230. Storing compensation factor 360 with compensated RGB triplet 370 allows a YUV triplet to be subsequently recovered.

Figure 10:
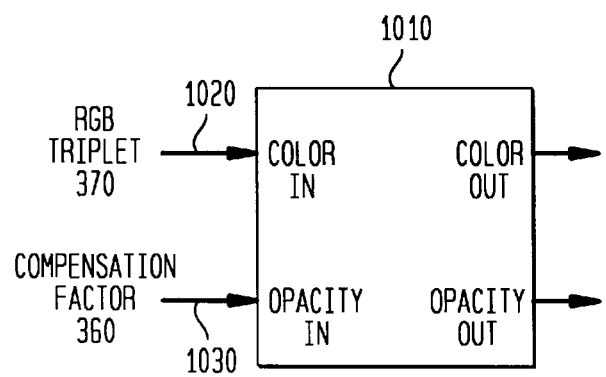
FIG. 10 illustrates a computer equipment having inputs for an RGB triplet and for an alpha channel.

In a preferred embodiment of the present invention, as shown in FIG. 10, compensation factor 360 is placed in an alpha channel 1030. A conventional computer equipment 1010 uses alpha channel 1030 to represent a characteristic of a pixel referred to as opacity. Conventional video equipment, however, does not always represent opacity. In computer equipment, opacity is an effect where the background is visible through an object in the foreground. When YUV color space 210 has no need to provide information regarding opacity on alpha channel 1030, alpha channel 1030 is available in a preferred embodiment of the present invention to store color information, i.e., compensation factor 360, otherwise lost during conversion.

Preferred Implementation of Translator

Figure 11:
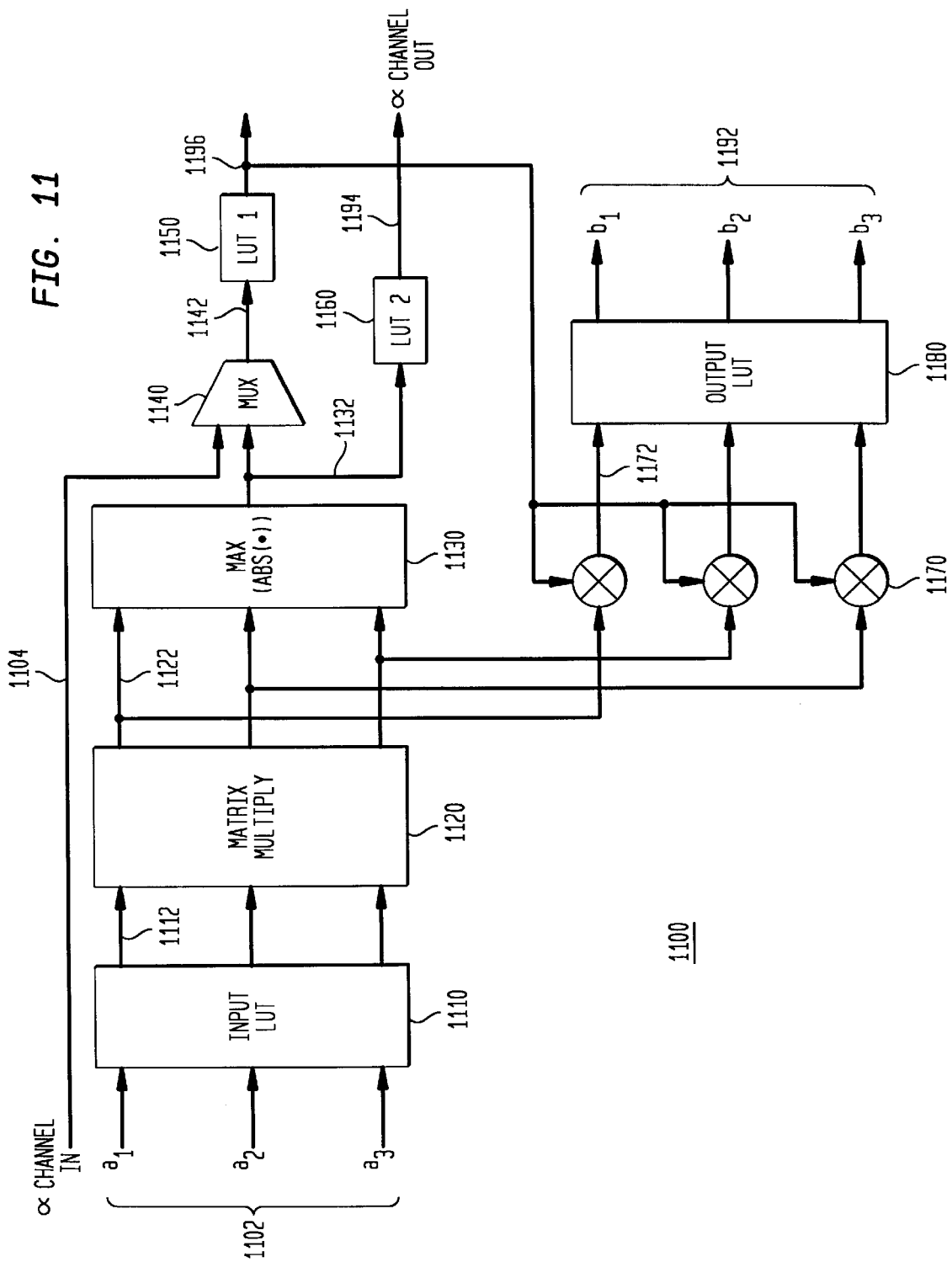
FIG. 11 is a block diagram of a preferred embodiment of a translator for performing both the conversion from a YUV color space to an RGB color space and the conversion from the RGB color space back to the YUV color space according to the present invention.

FIG. 11 illustrates a preferred implementation of a translator 1100 useful for implementing both translator 300 and translator 700. Translator 1100 includes an input lookup table (input LUT) 1110, a matrix multiplier 1120, a function block 1130, a multiplexer (mux) 1140, a first lookup table (first LUT) 1150, a second lookup table (second LUT) 1160, a multiplier bank 1170, and an output lookup table (output LUT) 1180. Translator 1100 receives an input triplet 1102 and alpha channel input 1104. Translator outputs an output triplet 1192 and alpha channel output 1194. Translator 1100 is implemented to operate in one of two modes: a YUV-to-RGB mode, for converting from YUV color space 210 to RGB color space 230, and a RGB-to-YUV mode, for converting from RGB color space 230 to YUV color space 210. The following description will discuss the operation of the elements of translator 1100 according to which mode is being used.

Input LUT 1110 receives input triplet 1102 and outputs a triplet 1112 based on whether translator 1100 is operating in YUV-to-RGB mode or RGB-to-YUV mode. If translator 1100 is operating in YUV-to-RGB mode, input LUT 1110 is loaded with information to perform the operation of summer 620 shown in FIG. 6. In this mode, input LUT 1110 receives YUV triplet 340 and outputs a YUV triplet 1112 with the Y component shifted by −0.5 according to the following equations:

$$Y_{out} = Y_{in} - 0.5, \quad \text{(Eq. 9A)}$$
$$U_{out} = U_{in}, \quad \text{(Eq. 9B)}$$
and
$$V_{out} = V_{in}, \quad \text{(Eq. 9C)}$$
where $(Y_{in}, U_{in}, V_{in})$ is and input to input LUT 1110, and $(Y_{out}, U_{out}, V_{out})$ is an output if input LUT 1110.

If translator is operating in RGB-to-YUV mode, input LUT 1110 is loaded with information to perform the operation of summer bank 810 shown in FIG. 8. In this mode, input LUT 1110 receives compensated RGB triplet 370 and outputs an RGB triplet 1112 with each component shifted by −0.5 according to the following equations:

$$R_{out} = R_{in} - 0.5, \quad \text{(Eq. 10A)}$$
$$G_{out} = G_{in} - 0.5, \quad \text{(Eq. 10B)}$$
and
$$B_{out} = B_{in} - 0.5, \quad \text{(Eq. 10C)}$$
where
$(R_{in}, G_{in}, B_{in})$ is an input to input LUT 1110,
and
$(R_{out}, G_{out}, B_{out})$ is an output of input LUT 1110.

Matrix multiplier 1120 receives triplet 1112 from input LUT 1110 and outputs triplet 1122. Matrix multiplier 1120 is functionally capable of performing a 3 by 3 matrix multiplication using coefficients supplied or downloaded to it. If translator 1100 is operating in YUV-to-RGB mode, matrix multiplier 1120 is loaded with coefficients to implement Eq. 1. In this mode, matrix multiplier receives YUV triplet 1112 and outputs triplet 1122 which corresponds to uncompensated RGB triplet 850. If translator 1100 is operating in RGB-to-YUV mode, matrix multiplier 1120 is loaded with coefficients to implement Eq. 7. In this mode, matrix multiplier receives RGB triplet 1112 and outputs triplet 1122 which corresponds to compensated YUV triplet 730.

Function block 1130 receives triplet 1122 and outputs a result 1132 dependent on the maximum of the absolute value of the components of triplet 1122. Function block implements Eq. 6. The operation of function block 1130 is identical to function block 610 above.

Mux 1140 receives alpha channel input 1104 as an input to translator 1100 and result 1132 from function block 1130. Mux 1140 outputs a result 1142 depending on the mode in which translator 1100 is operating. If translator 1100 is operating in YUV-to-RGB mode, mux 1140 selects result 1132 from function block 1130 as result 1142. If translator 1100 is operating in RGB-to-YUV mode, mux 1140 selects alpha channel input 1104 as result 1142. Mux 1140 outputs result 1142 to first LUT 1150.

First LUT 1150 receives result 1142 from mux 1140 and outputs a result 1196 to multiplier bank 1170 based on the mode in which translator 1100 is operating. If translator 1100 is operating in YUV-to-RGB mode, first LUT 1150 is loaded with information to perform the operation of function block 520 shown in FIG. 6. In this mode, first LUT 1150 receives result 1142 from mux 1140 and outputs result 1196 which corresponds to compensation factor 360. If translator 1100 is operating in RGB-to-YUV mode, first LUT 1150 is loaded with information to perform the following operation:

$$X_{out} = 2 * X_{in}. \quad \text{(Eq. 11)}$$

In this mode, first LUT 1150 receives alpha channel 1104 from mux 1140 and outputs result 1196 which corresponds to the inverse compensation factor 840.

Multiplier bank 1170 receives result 1196 from first LUT 1150 and triplet 1122 from matrix multiplier 1120, and outputs a triplet 1172 to output LUT 1180. Multiplier bank 1170 multiplies each component of triplet 1122 by result 1196.

Output LUT 1180 receives triplet 1172 from multiplier bank 1170 and outputs triplet 1192 based on the mode in which translator 1100 is operating. If translator 1100 is operating in YUV-to-RGB mode, output LUT 1180 is loaded with information to perform the operation of summer bank 540 shown in FIG. 6. In this mode, output LUT 1180 receives triplet 1172 from multiplier bank 1170 and outputs triplet 1192, which corresponds to compensated RGB triplet 370, according to the following equations:

$$O1_{out} = O1_{in} + 0.5, \quad \text{(Eq. 12A)}$$
$$O2_{out} = O2_{in} + 0.5, \quad \text{(Eq. 12B)}$$
and
$$O3_{out} = O3_{in} + 0.5, \quad \text{(Eq. 12C)}$$
where
$(O1_{in}, O2_{in}, O3_{in})$ is triplet 1172,
and
$(O1_{out}, O2_{out}, O3_{out})$ is triplet 1192.

If translator 1100 is operating in RGB-to-YUV mode, output LUT 1180 is loaded with information to perform the operation of summer bank 840 shown in FIG. 8. In this mode, output LUT 1180 receives triplet 1172 from multiplier bank 1170 and outputs triplet 1192, which corresponds to recovered YUV triplet 740, according to the following equations:

$$O1_{out} = O1_{in} + 0.5, \quad \text{(Eq. 13A)}$$
$$O2_{out} = O2_{in}, \quad \text{(Eq. 13B)}$$
and
$$O3_{out} = O3_{in}, \quad \text{(Eq. 13C)}$$
where
$(O1_{in}, O2_{in}, O3_{in})$ is triplet 1172,
and
$(O1_{out}, O2_{out}, O3_{out})$ is triplet 1192.

Second LUT 1160 receives result 1132 from function block 1130 and outputs an alpha channel output 1194. Second LUT 1160 is used in the preferred embodiment only when translator 1100 is operating in YUV-to-RGB mode. Second LUT 1160 outputs information corresponding to compensation factor 360 onto alpha channel 1030. In the preferred embodiment, translator 1100 outputs result 1132 directly as alpha channel output 1194 to alpha channel 1030 rather than compensation factor 360. This is because result 1132 is proportional to inverse compensation factor 840 already. Specifically, in YUV-to-RGB mode, alpha channel output 1194 is determined by:

$$\alpha = 1/(2 * k) \quad \text{(Eq. 14)}$$
where
$\alpha$ is alpha channel output 1194
and
k is compensation factor 360.

As thus described with respect to YUV color space 210 and RGB color space 230, it will be readily apparent how translator 1100 can be adapted to other color spaces. For example, information supplied or downloaded to input LUT 1110, first LUT 1150, second LUT 1160, output LUT 1180 and matrix multiplier 1120 can be easily modified to accommodate conversions between other color spaces.

What is claimed is:

1. A method for converting a color between a first color space and a second color space, the method comprising the steps of:
   determining a second triplet representing the color in the second color space from a first triplet representing the color in the first color space;
   determining a compensation factor;
   applying said compensation factor to said second triplet resulting in a compensated second triplet, wherein said compensation factor adjusts said second triplet to a valid triplet in the second color space when said second triplet is an invalid triplet in the second color space; and storing said compensation factor so that the first color in the first color space can be reconstructed from said second triplet and said compensation factor.

2. The method of claim 1, further comprising the steps of:

recovering said first triplet from said compensated second triplet and said compensation factor.

3. A system for converting a color from a first color space to a second color space, the system comprising:

a color space converter that receives the color in the first color space and determines an uncompensated color in the second color space;

a compensation determinator, coupled to said color space converter, that receives said uncompensated color and determines a compensation factor based on whether said uncompensated color is a valid color in the second color space;

a compensation adjustor, coupled to said color space converter and said compensation determinator, that receives said uncompensated color and said compensation factor and determines a compensated color, said compensated color being a valid color in the second color space; and a compensation factor storage device, coupled to said compensation determinator, that stores said compensation factor so that the first color in the first color space can be reconstructed from said compensated color and said compensation factor.

4. The system of claim 3, wherein said compensation determinator determines said compensation factor so that said compensation factor adjust a saturation of the color and a luminance of the color without adjusting a hue of the color when applied to said uncompensated color.

5. A imaging system comprising:

a video source for supplying a video image;

a computer destination for displaying a computer graphic image; and a translator, coupled between said video source and said computer destination, for converting said video image into said computer graphic image, said translator further comprising:

means for converting a color in said video image to a compensated color in said computer graphic image using a compensation factor, said compensated color represented in a second color space, and means for storing said compensation factor and compensated color so that said color can be subsequently recovered from said compensated color and said compensation factor.

6. The imaging system of claim 5, wherein said means for storing further comprises an alpha channel in said computer destination.

7. The imaging system of claim 6, further comprising:

a second translator, coupled to said computer destination, for converting said computer graphic image into a second video image, said translator further comprising:

means for converting said compensated color in said computer graphic image to a recovered color in said second video image using said compensation factor, said recovered color represented in said first color space, wherein said recovered color in said second video image and said color in said video image are equivalent.

8. The imaging system of claim 7, further comprising a video destination, coupled to said second translator, for receiving said second video image.

9. A imaging system comprising:

a video source for supplying a video image;

a translator, coupled to said video source, for converting said video image into a computer graphic image, said translator further comprising:

a color space converter that determines an uncompensated color in said computer graphic image from a color in said video image;

a compensation determinator, coupled to said color space converter, that determines a compensation factor based on said uncompensated color, and a compensation adjustor, coupled to said color space converter and said compensation determinator, that determines a compensated color from said uncompensated color and said compensation factor, wherein said compensated color is a valid color in said computer graphic image; and means for storing said compensation factor and said compensated color so that said color in said video image can be reconstructed from said compensated color and said compensation factor.

10. The imaging system of claim 9, wherein said means for storing comprises an alpha channel.

11. The imaging system of claim 10, further comprising a computer destination, coupled to said translator, that receives said computer graphic image.

12. The imaging system of claim 11, further comprising:

a second translator, coupled to said computer destination, that converts said computer graphic image into a second video image, said translator further comprising:

a reverse color space converter that determines a corresponding compensated color in a second video image from said compensated color in said computer graphic image, and a compensation readjustor, coupled to said reverse color space converter, that determines a recovered color in said second video image from said corresponding compensated color and said compensation factor, wherein said recovered color and said color are equivalent.

13. The imaging system of claim 12, further comprising a video destination, coupled to said second translator, for receiving said second video image.

14. A method for converting a color of a pixel represented as a first triplet in a first color space to a second triplet in a second color space, the method comprising the steps of:

determining the second triplet from the first triplet according to conversion equations governing the conversion between the first color space and the second color space;

determining whether a component of the second triplet exceeds a valid component range of the second color space;

if said component of the second triplet exceeds the valid component range of the second color space, determining a compensation factor for the second triplet so that said component no longer exceeds the valid component range of the second color space;

determining a compensated triplet from the second triplet and said compensation factor; and associating said compensated triplet with said compensation factor so that the first triplet can be subsequently recovered from said compensated triplet and said compensation factor.

15. A method for converting a first color in a first color space to a second color in a second color space, wherein the second color is a valid color in the second color space, the method comprising the steps of:

converting the first color into an initial second color according to conversion equations between the first color space and the second color space;

determining a compensation factor for converting said initial second color into the second color, when said initial second color is an invalid color in the second color space;

converting said initial second color into the second color according to said compensation factor; and storing said compensation factor so that the first color in the first color space can be reconstructed from said second color and said compensation factor.

16. The method of claim 15, wherein said step of determining a compensation factor further includes:

setting said compensation factor to an inactive value when said initial second color is a valid color in the second color space.

17. The method of claim 15, wherein said step of converting said initial second color into the second color comprises the step of:

adjusting a luminance level and a saturation level of said initial second color while holding a hue level of said initial second color constant so that the second color becomes a valid color in the second color space.

18. The method of claim 15, wherein said step of determining a compensation factor is based on adjusting a luminance level and a saturation level of said initial second color while holding a hue level of said initial second color constant until the second color becomes a valid color in the second color space.

19. The method of claim 15, further comprising the step of:

using said compensation factor and said conversion equations to recover the first color from said second color.

20. The method of claim 15, wherein said compensation factor is stored with said second color on an alpha channel.

* * * * *